United States Patent [19]

Nagao

[11] Patent Number: 5,415,082
[45] Date of Patent: May 16, 1995

[54] WATER-REMOVING RING FOR AN OIL-COOKING VESSEL

[76] Inventor: Ken Nagao, 2456-6, Takao, Niimi, Okayama, Japan

[21] Appl. No.: 205,615

[22] Filed: Mar. 4, 1994

[30] Foreign Application Priority Data

Mar. 5, 1993 [JP] Japan .............................. 5-015131 U

[51] Int. Cl.6 ............................................. A47J 27/00
[52] U.S. Cl. ........................................ 99/403; 99/410; 126/369; 126/373; 220/912
[58] Field of Search ....................... 99/403, 410–417, 99/400, 444–446; 126/369, 373, 390; 220/912, 254; 210/464–469

[56] References Cited

U.S. PATENT DOCUMENTS

| | | | |
|---|---|---|---|
| 1,648,725 | 11/1927 | Endicott | 99/413 X |
| 3,808,963 | 5/1974 | Ludena | 99/417 |
| 4,574,776 | 3/1986 | Hidle | 126/369 |
| 4,739,698 | 4/1988 | Allaire | 99/410 |
| 4,832,225 | 5/1989 | Benjamin | 99/413 X |
| 5,178,761 | 1/1993 | Mohun | 210/469 |
| 5,211,105 | 5/1993 | Liu | 99/400 |

FOREIGN PATENT DOCUMENTS

| | | |
|---|---|---|
| 43614 | 3/1929 | Japan . |
| 2139613 | 6/1987 | Japan . |

*Primary Examiner*—Timothy F. Simone
*Attorney, Agent, or Firm*—Koda and Androlia

[57] ABSTRACT

A water-removing ring made of heat conductive materials and set on an edge of an oil-cooking utensil including a cylindrical contact part that comes into contact with the inner surface of the cooking utensil and a projecting part extending horizontally and inwardly from the inner surface of the cylindrical contact part and having a plurality of grooves so that evaporated moister is collected on the projecting part and then evaporated again.

5 Claims, 2 Drawing Sheets 5,415,082

WATER-REMOVING RING FOR AN OIL-COOKING VESSEL

BACKGROUND OF THE INVENTION

1. Field of the Invention

The present invention relates to a water-removing ring used in a cooking utensil and more particularly to a device for collecting water inside a cooking pot.

2. Prior Art

When cooking tempura and karaage, each being Japanese dishes prepared by deep-frying with or without batter, a cover or lid is not used. In other words, there has been no thought of covering the cooking vessel when these food are prepared by oil heated in the vessel.

The reason for this is to prevent water droplets from falling into the heated oil. More specifically, during cooking, moisture is created, and the moisture gathers into water droplets which adhere to the undersurface of the cover. These water droplets would drop into the heated oil when the cover is removed during and after cooking. When water droplets drop into the heated oil, the oil is splashed and scattered around, endangering the food preparer.

If cooking with heated oil was performed under high-temperature conditions using a cooking vessel that has good heat-retaining properties and thermal conductivity made of a multi-layer metal material, a water seal is formed between the vessel and the lid. This is called "steam frying" cooking. In this "steam-frying" cooking, moisture in the oil and food ingredients evaporate and is filled inside the vessel, so that the "steam frying" provides extremely tasty dishes with a small amount of oil.

So as to realize this type of cooking, the inventor of the present application made an invention and filed a patent application in Japan (Japanese Patent Application laid-Open [Kokai] No. 62-139613). This device, a water-removing ring, is set on a cooking vessel. The water droplets flowing downward from the undersurface of the lid of the cooking vessel are collected in this ring and is re-evaporated so as to accelerate the steaming.

This water-removing ring is a useful device; however, for small cooking appliances, it is desirable that the water-removing ring be easily heated, which is the key to good moisture re-evaporation. In addition, it is also desirable that the ring does not cause the oil to spatter from below when the lid is removed.

SUMMARY OF THE INVENTION

Accordingly, an object of the present invention is to provide a device that can satisfy the desires described above.

It is another object of the present invention to provide a water-removing ring which can promote re-evaporation of moisture to a greater extent and also prevent the spattering of oil.

In order to accomplish the object, the water-removing ring of the present invention, which is used for cooking vessels, particularly for an oil-use cooking pot, is designed so that it is set on the lid-receiving part of the main body of a cooking vessel (which is constructed, for example, from a multi-layer metal material) and is made of a contact part and a projecting part. The contact part comes into contact with the main body of the vessel when the ring is set on the lid-receiving part of the vessel, and the projecting part, which is continuous to the contact part, projects inwardly toward the center of the vessel.

The contact part extends vertically above and below the projecting part so that a sufficient contact length for making a good contact relationship with the main body of the vessel is ensured. The projecting part extends from the contact part substantially in a horizontal direction inwardly and has an upwardly inclined edge at the inner edge.

More specifically, the water-removing ring comprises the vertical contact part and the horizontal projecting part so that the ring can have a relatively large surface area. In addition, the vertical contact part has a large contact area with respect to the main body of the vessel. Thus, the water-removing ring can be heated and maintained at a sufficiently high temperature via the conduction of heat from the vessel and via direct heating provided by the high-temperature atmosphere inside the vessel.

Accordingly, the re-evaporation of water droplets collected on the upper surface of the water-removing ring can be promoted. In addition, since the projecting part is designed substantially horizontally, moisture which flows down onto the surface of the projecting part can spread out evenly in a form of a thin layer. As a result, evaporation is promoted even further.

As seen from the above, the amount of water droplets adhering to the undersurface of the lid can be small, and the quantity of water droplets dropping from the undersurface of the lid into the vessel can be reduced.

Even with the structure described above, the adhesion of water droplets to the under-surface of the lid cannot be avoided completely, and when the lid is removed, the resulting vibration causes these water droplets to be separated from the lid and fall. However, since the water-removing ring is placed in the vessel, the falling water droplets are caught by this water-removing ring and do not drop into the heated oil. Furthermore, the water-removing ring can act to block the spattering of the heated oil, so that spattering oil cannot reach the lid. In addition, the sound of oil popping and the striking of the oil against the lid are eliminated. Thus, the food preparer may have a feeling of safety during cooking.

DETAILED DESCRIPTION OF THE INVENTION

Figure 1:
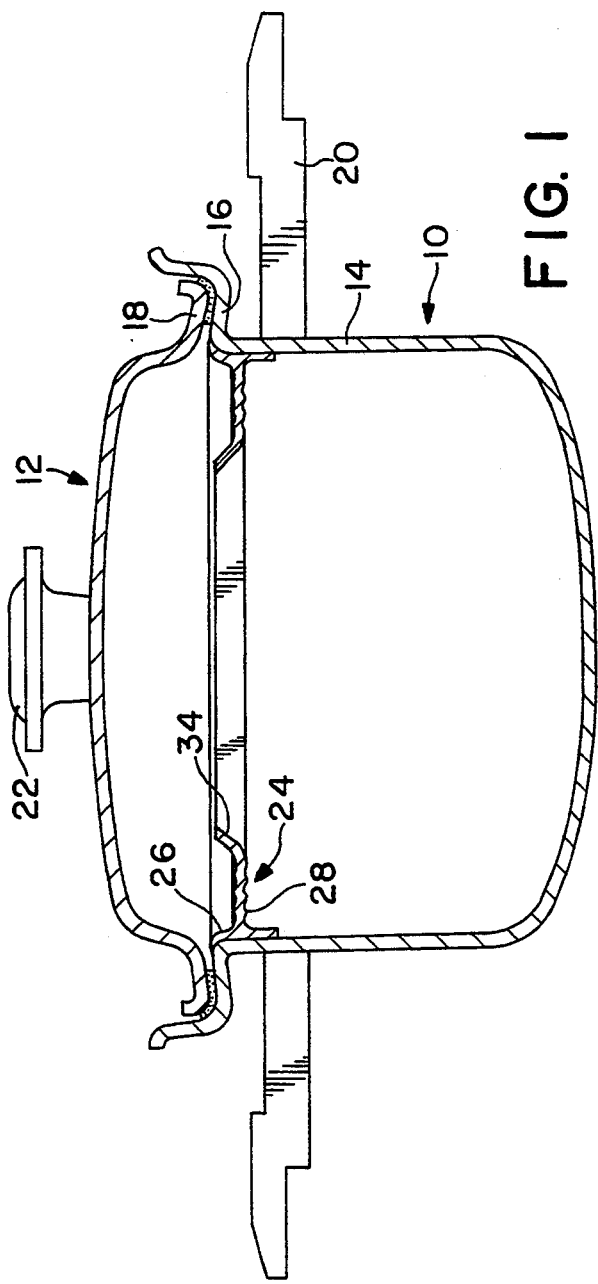
FIG. 1 shows a cross section of an oil cooking vessel with the water-removing ring according to one embodiment of the present invention.
Figure 2:
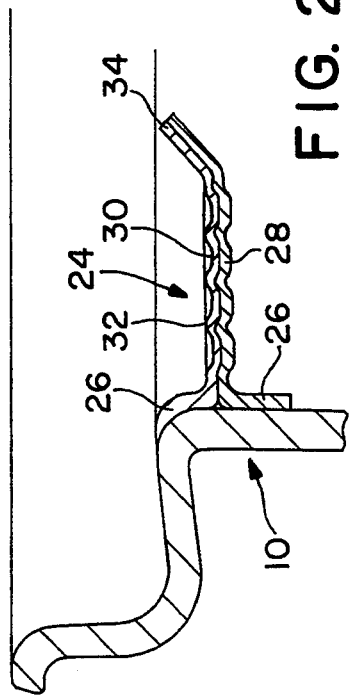
FIG. 2 is an enlarged partial cross sectional view of the water-removing ring of FIG. 1.

In FIG. 1, the cooking vessel comprises a main body 10 and a lid 12.

The main body 10 of the vessel is obtained from, for example, a multi-layer metal material formed by laminating stainless steel (which has good heat-retaining properties) and aluminum (which has good thermal conductivity) in three to seven layers. The main body 10 includes a deeply recessed barrel part 14 and a lid-receiving part 16. The lid-receiving part 16 projects outwardly in a flange form from the upper edge of the barrel part 14.

The lid 12 has an inverted bowl shape. The circumferential edge of the lid 12 is a fitting part 18 which can snugly fit on the lid-receiving part 16 of the main body 10 of the vessel. If the lid 12 is made of glass or plastic so as to be transparent, the inside of the main body 10 can be seen, providing the feeling of security.

The main body 10 has handles 20 on the outer circumference, and the lid 12 has a knob 22 on the top surface.

When cooking with this cooking vessel, oil is first put in the main body 10 of the vessel, the vessel is covered with the lid 12 and heated, and then food ingredients are put in the heated oil.

During cooking, the heat causes the moisture in the food ingredients and oil to evaporate. Some of this moisture directly accumulates in the space between the lid-receiving part 16 and the fitting part 18, while another portion of the moisture accumulates in the space between the lid-receiving part 16 and the fitting part 18 after flowing downward on the undersurface of the lid 12. As a result of these accumulated moisture, a seal is formed between the inside and outside of this main body 10 of the vessel, which is called a "water seal."

After the seal has been created, the pressure inside the main body 10 of the vessel increases, and the inside of the main body 10 reaches an extremely high temperature as a result of the combined effect of the good thermal conductivity and superior heat-retaining properties of the main body 10 of the vessel which is made of a multi-layer metal material. Thus, the temperature of the oil can exceed 180° C.

As a result, the evaporation of water and the agitation of the oil are promoted, and "steam frying" is accomplished at this point. If tempura or karaage can be steam-fried, a tasty dish is obtained with a small amount of oil.

If the vessel is made of aluminum, the heat will easily escape. If the vessel is made of iron, the conduction of heat is poor. In either case, it is not possible to obtain a high temperature, and steam frying cannot be accomplished.

If heating is continued, the moisture will be scattered by the heated oil and evaporates. A portion of the moisture will break the "water seal" and escape to the outside. The remaining small amount of moisture will form water particles adhering to the undersurface of the lid 12. These water particles will grow into water droplets and fall into the main body 10 of the vessel. When the water droplets fall into the vessel, they are evaporated again. If this moisture can be caught at an intermediate point so that it does not fall into the vessel, the evaporation of the moisture would be accelerated.

Accordingly, the water-removing ring 24 of the present invention is used in a freely removable fashion. The ring 24 sits on the lid-receiving part 16 of the vessel in order to catch the moisture.

More specifically, the oil-receiving ring 24 comprises a contact part 26 and a projecting part 28. The contact part 26 contacts the barrel part 14 of the main body 10 and is anchored to a portion of the lid-receiving part 16. The projecting part 28 is formed continuous to the contact part 26 and projects toward the center of the barrel part 14.

The contact part 26 is a vertical wall and extends above and below the projecting part 28 so that a sufficient length to make a good contact with the barrel part 14 of the vessel is ensured. The vertical length of the contact part 26 is equal to or slightly smaller than the amount of projection of the projecting part 28. The projecting part 28 extends inwardly and substantially in the horizontal direction. A plurality of independent grooves 30 may be formed in the upper surface of the projecting part 28.

As seen from above, the contact part 26 has a sufficient contact length relative to the cooking vessel in order to increase the heat conductivity relative to the heated barrel part 14 of the vessel so as to raise the temperature of the ring efficiently.

On the other hand, the projecting part 28 extends horizontally so that the moisture falling onto the surface of the projecting part 28 can spread evenly and evaporates more efficiently.

In addition, grooves 30 can increase the overall surface area of the ring 24 to promote a rise in temperature and evaporation smoothness. The grooves 30 are formed independently so that the upper edges of the grooves 30 form a reference surface 32 that is continuous to smoothly scatter the moisture which overflows from the grooves 30. In order to accomplish this, more efficiently, it is desirable to form a plurality of shallow grooves 30.

Furthermore, it is preferable that the projecting part 28 be projected from as high a position as possible on the contact part 26. With this high position of the contact part 26, the blocking effect against oil, etc. spattered from below is increased, and the moisture falling from above is more sufficiently caught by the ring.

Figure 3:
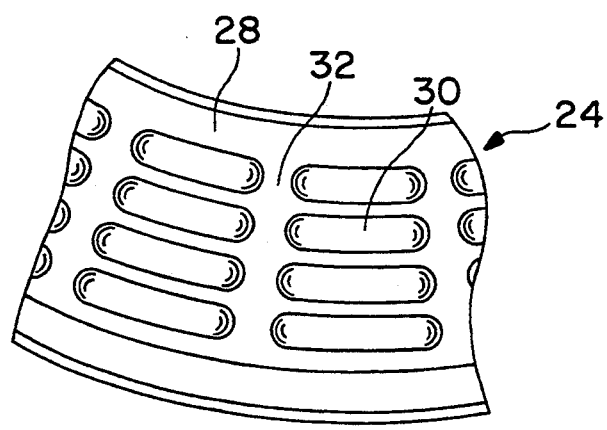
FIG. 3 is an enlarged partial top view of the water-removing ring of the present invention.
Figure 4:
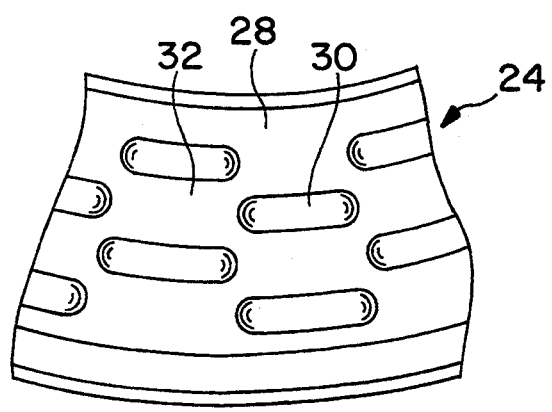
FIG. 4 is an enlarged partial top view of another type of water-removing ring of the present invention.

FIGS. 3 and 4 illustrate two different arrangements of the grooves 30. In FIG. 3, the grooves are arranged concentrically; and in FIG. 4, the grooves are arranged in a zig zag pattern. In either way, many grooves 30 are formed individually so that the continuous reference surface 32 is formed on the ring 24.

As a result, the moisture falling onto the upper surface of the projecting part 28 can be uniformly scattered and smoothly evaporated.

In order to prevent moisture on the upper surface of the projecting part 28 from falling into the main body 10, and in order to positively block the spattering of the oil from below, the inner edge of the projecting part 28 is bent upwardly to form an inclined part 34 so that it reaches approximately the same height as the upper edge of the contact part 26.

The water-removing ring 24 is made of stainless steel and other materials. It can be made of a multi-layer metal material which is similar to the material of the main body 10. In this case, the temperature increase of the water-removing ring 24 is greatly improved, and the re-evaporation of moisture is promoted. Also, the contact part 26 is in a cylindrical shape and the projecting part 28 is in a ring shape having a certain width. The ring 24 thus obtained can be separated into several segments.

As seen from the above, the water-removing ring 24 of the present invention can prevent moisture that fills the inside of the vessel and water droplets that adhere to the underside of the lid 12 from falling into the heated oil in the vessel. Accordingly, water re-evaporation is promoted so that the re-evaporated moisture can go outside of the vessel.

In actuality, when the water-removing ring 24 is used, the amount of steam which breaks the "water seal" and escapes to the outside of the vessel is greater than the amount of steam that escapes in a vessel that uses no such water-removing ring 24. As a result, the water droplets adhering to the undersurface of the lid 12 are small in diameter, and the amount of such water droplets is also small. Accordingly, almost no water droplets fall into the heated oil of the vessel during cooking and at the time the lid 12 is removed for taking out the cooked food.

Even if the water droplets should fall, the amount of water is extremely small. Also, since the water droplets fall onto the surface of the water-removing ring, they do not drop into the oil below. Accordingly, with the water-removing ring 24 of the present invention, the tempura and karaage are cooked with the lid 12 set on the cooking vessel.

In addition, the water-removing ring 24 of the present invention can block most of the oil and water which spatter during cooking. Thus, the oil and water are prevented from escaping to the outside. In particular, the water-removing ring 24 can effectively block the oil and water which are spattered toward the outer circumference of the vessel. Accordingly, the lid 12 can be removed safely even during cooking, and the loud popping noise caused by spattering oil, etc. and striking the lid 12 are eliminated. The food preparer is thus given a feeling of security. If all or a part of the lid 12 is transparent, the cooking process can be observed, increasing the feeling of security.

As seen from the above, according to the water-removing ring of the present invention, cooking such as tempura and karaage that uses heated oil can be done with a lid on the cooking vessel. Accordingly, the taste of the resulting food can be improved. In addition, since the amount of oil required can be small, cooking oil of high-quality can be used. Thus, the present invention is both healthful and economical. Moreover, since the amount of waste oil discarded after use can be also reduced, pollution problems can also be avoided.

I claim:

1. A water-removing ring for an oil cooking vessel, said ring being removably anchored to a lid-receiving part of a main body of said vessel, characterized in that said water-removing ring is constructed from a multi-layer metal material and consists of a cylindrical contact part, which contacts an interior surface of said main body of said vessel, and a projecting part, which is continuous to said contact part and projects toward a center of said main body of said vessel, said contact part extending above and below said projecting part so that a sufficient contact length is insured, and said projecting part extends substantially horizontally and has an upwardly inclined part on an inner edge of said projecting part.

2. A water-removing ring according to claim 1, further comprising a plurality of independent grooves formed in an upper surface of said projecting part.

3. A water-removing ring removably provided on an edge of a cooking vessel, said ring comprising:
   a cylindrical contact part in contact with an inner surface of said cooking vessel; and
   a ring shape, projecting part extending inwardly from an inner surface of said cylindrical contact part, said projecting part being substantially horizontal with an inner edge of said projecting part bent upwardly.

4. A water-removing ring according to claim 3, wherein said cylindrical contact part and said ring shape projecting part are made of heat conductive materials.

5. A water-removing ring according to claim 4, further comprising a plurality of grooves formed on an upper surface of said projecting part.

* * * * *